US010235960B2

(12) United States Patent
Kim (10) Patent No.: US 10,235,960 B2
(45) Date of Patent: Mar. 19, 2019

(54) SOURCE DRIVER CAPABLE OF HIGH SPEED CHARGING AND DISCHARGING

(71) Applicant: INNOAXIS CO., LTD, Namyangju-si, Gyeonggi-do (KR)

(72) Inventor: Hwi-Cheol Kim, Seoul (KR)

(73) Assignee: INNOAXIS CO., LTD, Namyangju-si, Gyeonggi-Do (KR)

( * ) Notice: Subject to any disclaimer, the term of this patent is extended or adjusted under 35 U.S.C. 154(b) by 0 days.

(21) Appl. No.: 15/613,456

(22) Filed: Jun. 5, 2017

(65) Prior Publication Data

US 2017/0358269 A1    Dec. 14, 2017

(30) Foreign Application Priority Data

Jun. 14, 2016    (KR) .......................... 10-2016-0073798

(51) Int. Cl.
*G09G 3/20*    (2006.01)
*G09G 3/36*    (2006.01)
*H02N 2/04*    (2006.01)

(52) U.S. Cl.
CPC ............. *G09G 3/3688* (2013.01); *G09G 3/20* (2013.01); *G09G 3/2025* (2013.01); *H02N 2/04* (2013.01);
(Continued)

(58) Field of Classification Search
CPC ... G09G 2310/0248; G09G 2310/0291; G09G 3/20; G09G 3/2025; G09G 3/3688;
(Continued)

(56) References Cited

U.S. PATENT DOCUMENTS

| 6,281,826 B1 * | 8/2001 | Kimura | G09G 3/2011 341/144 |
| 2005/0040889 A1 * | 2/2005 | Tsuchi | H03F 3/3022 330/255 |
| 2009/0102829 A1 * | 4/2009 | Abe | G09G 3/325 345/214 |
| 2010/0231577 A1 * | 9/2010 | Kim | G09G 3/3648 345/212 |

(Continued)

FOREIGN PATENT DOCUMENTS

| JP | H08-87248 A | 4/1996 |
| JP | H10-11032 A | 1/1998 |

(Continued)

OTHER PUBLICATIONS

Korean Notice of Allowance for related KR Application No. 10-2016-0073798 dated Apr. 17, 2017 from Korean Patent Office.
(Continued)

*Primary Examiner* — Richard J Hong
(74) *Attorney, Agent, or Firm* — Paratus Law Group, PLLC (57) ABSTRACT

Provided are a source driver for receiving a digital signal and providing a grayscale signal corresponding to the digital signal and a display device for displaying content. The source driver includes an amplifier configured to provide a grayscale signal, a second driving switch configured to provide the grayscale signal provided by the amplifier to an output node or block the grayscale signal, and a first driving unit including a first switch whose one end is connected to a first voltage and whose other end is connected to the output node and a second switch whose one end is connected to a second voltage and whose other end is connected to the output node, and configured to first drive the output node. The output node is first driven by the first driving unit and then second driven by the amplifier with the grayscale signal.

6 Claims, 7 Drawing Sheets

(52) U.S. Cl.
CPC .......... *G09G 2310/027* (2013.01); *G09G 2310/0248* (2013.01); *G09G 2310/0291* (2013.01); *G09G 2370/08* (2013.01)

(58) Field of Classification Search
CPC .......... G09G 3/3648; G09G 3/3258; G09G 2310/027; G09G 2370/08; H02N 2/04; H03F 3/3022
See application file for complete search history.

(56) References Cited

U.S. PATENT DOCUMENTS

2011/0234652 A1* 9/2011 Lee .............. G09G 3/3696 345/690
2017/0263185 A1* 9/2017 Nakagawa .......... G09G 3/3258

FOREIGN PATENT DOCUMENTS

| | | |
|---|---|---|
| JP | 2003-207760 A | 7/2003 |
| JP | 2007-093996 A | 4/2007 |
| JP | 2008-281913 A | 11/2008 |
| KR | 10-0486292 B1 | 4/2005 |
| KR | 10-2007-0118534 A | 12/2007 |
| KR | 10-2008-0003033 A | 1/2008 |
| KR | 10-1404084 B1 | 6/2014 |

OTHER PUBLICATIONS

Japanese Office Action for related JP application No. 2017-113954 dated May 1, 2018 from Japanese Patent Office.

* cited by examiner

SOURCE DRIVER CAPABLE OF HIGH SPEED CHARGING AND DISCHARGING

CROSS-REFERENCE TO RELATED APPLICATION

This application claims priority to and the benefit of Korean Patent Application No. 10-2016-0073798, filed on Jun. 14, 2016, the disclosure of which is incorporated herein by reference in its entirety.

BACKGROUND

1. Field of the Invention

The present invention relates to a source driver capable of high speed charging and discharging.

2. Discussion of Related Art

A cellular phone, a tablet or a personal computer (PC), etc. have display units for displaying information to users. A display unit includes a display panel and circuitry, such as a source driver, a gate driver, a timing controller, etc., for driving the display panel, and the circuitry is implemented as silicon-based complementary metal-oxide semiconductor (CMOS) circuitry. The source driver generates a grayscale voltage corresponding to input digital bits and drives pixels included in the display panel. The timing controller and the source driver may be formed in separate chips or one chip according to a resolution and characteristics of the display panel.

An afterimage generated while a user is viewing a video, etc. is a factor by which the picture quality of a display is determined. A problem of a long-lasting afterimage, etc. results from a response speed of a display driver or each pixel of a display being slower than the speed of change in pixel data. To eliminate dizziness of a user of a virtual reality (VR) display which is attracting attention as a future display device, it is required to remarkably improve a frame rate compared to existing displays. To this end, it is necessary to develop a display driving method for a high response speed.

An operating speed of a source driver chip used for pixel data driving in an existing display driver integrated circuit (IC) is dependent on a slew rate of an output buffer for data driving. It is possible to increase a bias current to improve the slew rate. However, an increase in bias current leads to an increase in power consumption of the source driver chip and thus is not suitable for a mobile environment.

SUMMARY OF THE INVENTION

The present invention is directed to overcoming the disadvantages of a source driver according to the related art and providing a source driver and a display device that may drive pixels at high speed without increasing power consumption.

According to an aspect of the present invention, there is provided a source driver including: an amplifier configured to provide a grayscale signal; a second driving switch configured to provide the grayscale signal provided by the amplifier to an output node or block the grayscale signal; and a first driving unit including a first switch whose one end is connected to a first voltage and whose other end is connected to the output node, a second switch whose one end is connected to a second voltage and whose other end is connected to the output node, and configured to first drive the output node, wherein the output node is first driven by the first driving unit and then second driven by the amplifier with the grayscale signal.

According to another aspect of the present invention, there is provided a source driver including: an amplifier configured to provide a grayscale signal; a second driving switch configured to provide the grayscale signal provided by the amplifier to an output node or block the grayscale signal; and a first driving unit including a pumping capacitor and configured to first drive the output node at a voltage charged in the pumping capacitor, wherein the output node is first driven by the first driving unit and then second driven by the amplifier with the grayscale signal.

According to another aspect of the present invention, there is provided a display device including: a timing controller; a gate driver; a display panel; and a source driver configured to receive a digital signal and output a grayscale signal corresponding to the digital signal, wherein the source driver includes: an amplifier configured to provide the grayscale signal; a second driving switch configured to provide the grayscale signal provided by the amplifier to an output node or block the grayscale signal; and a first driving unit configured to first drive the output node at an intended voltage, and the output node is first driven by the first driving unit and then second driven by the amplifier at a grayscale voltage.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
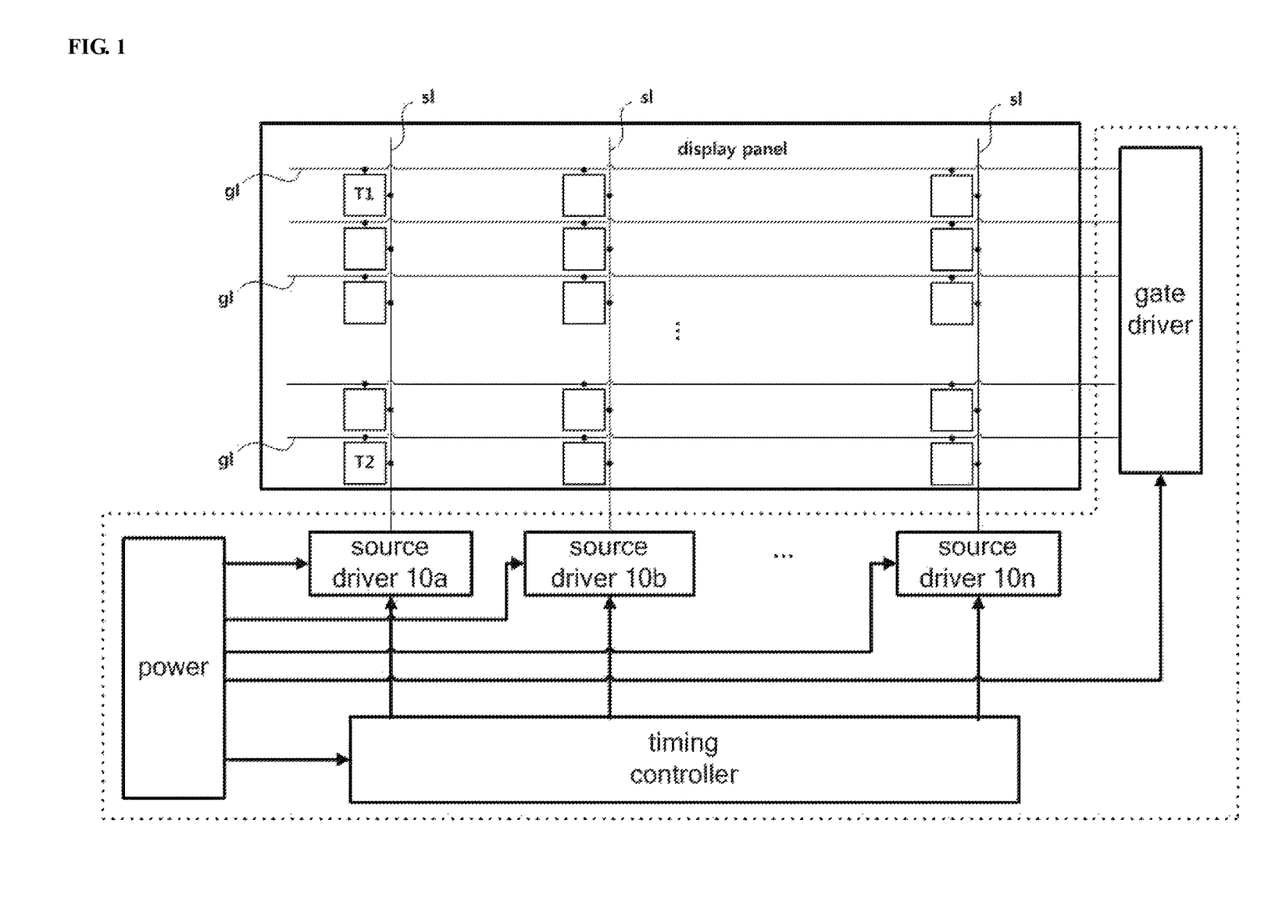
FIG. 1 is a diagram schematically showing a display system.

Hereinafter a source driver and a display device according to the present embodiment will be described with reference to the accompanying drawings. FIG. 1 is a diagram schematically showing a display system. Referring to FIG. 1, a display system according to the present embodiment includes a display panel, a gate driver, source drivers 10a, 10b, . . . , and 10n, and a timing controller which changes characteristics of a screen source applied from the outside of the display system or adjusts a driving time point according to a resolution and characteristics of the display system. According to characteristics of the display panel, the timing controller and the source drivers 10a, 10b, . . . , and 10n may be formed in separate chips or formed in one chip as exemplified in the drawing.

The display panel includes a plurality of pixels, and each pixel is connected to the gate driver through a gate line gl and electrically connected to the source drivers 10a, 10b, ..., and 10n through source lines sl. The source lines sl transfer grayscale signals to be displayed by pixels to the pixels.

The source lines sl to pixels are conductive lines, in which resistive components of the conductive lines and several parasitic capacitances, such as, parasitic capacitances between adjacent lines, parasitic capacitances with a reference electrode, and so on are present. These loads and switches, such as thin film transistors (TFTs) in pixels, may be modeled by a resistance-capacitor (RC) pair. In other words, loads to be driven by a source driver are configured in a distributed RC form.

Hereinafter, a length of a source line which connects a source driver and a pixel is referred to as an electrical distance between the source driver and the pixel. Therefore, an electrical distance between the source driver 10a and a pixel T1 of FIG. 1 is longer than an electrical distance between the source driver 10a and a pixel T2. Also, providing a voltage to a source line and a pixel included in the display panel through an output node of a source driver to provide an intended voltage to the pixel is referred to as "driving an output node."

Figure 2:
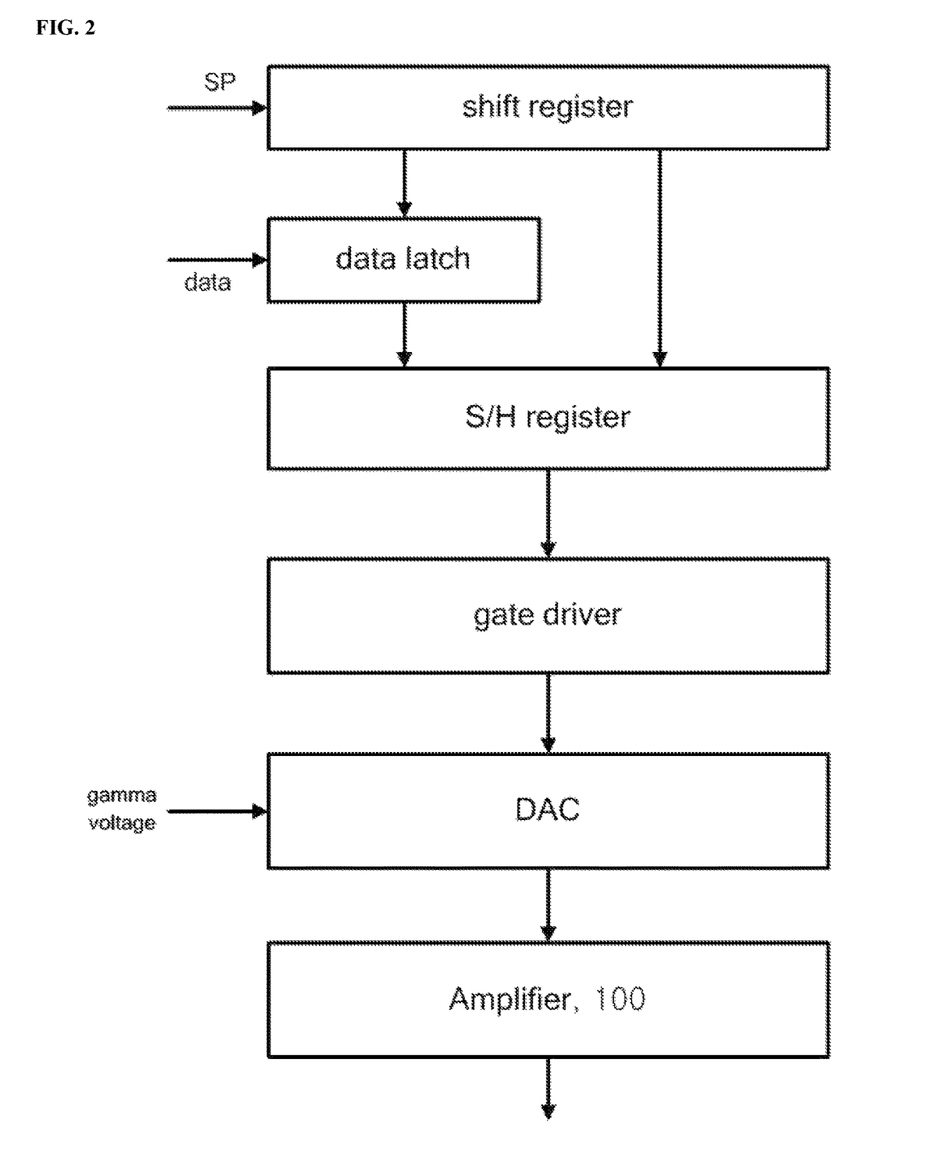
FIG. 2 is a block diagram schematically showing an outline of a source driver 10 according to the present embodiment.

FIG. 2 is a block diagram schematically showing an outline of a source driver 10 according to the present embodiment. Referring to FIG. 2, the source driver 10 includes a shift register, a data latch, a sample/hold (S/H) register, a gate driver, a digital-analog converter (DAC), and an amplifier. For example, the amplifier may be a unity gain buffer.

The shift register sequentially shifts and outputs an input start pulse SP. The data latch latches up and provides video data, and the S/H register samples a latch-up video signal according to the start pulse SP and holds and provides sampled data to the gate driver.

The gate driver receives digital bits and provides output signals which swing between different voltages. The DAC receives, for example, a gamma voltage, converts an output signal provided by the gate driver into an analog signal, and provides the analog signal, and the unity gain amplifier amplifies the analog signal and provides the amplified analog signal to the display panel so that a video corresponding to the input data may be displayed. In another example, to the DAC, a voltage obtained by adding an upper headroom voltage to a highest value of the gamma voltage may be provided as a highest voltage, and a voltage obtained by subtracting a lower headroom voltage from a lowest value of the gamma voltage may be provided as a lowest voltage.

Figure 3:
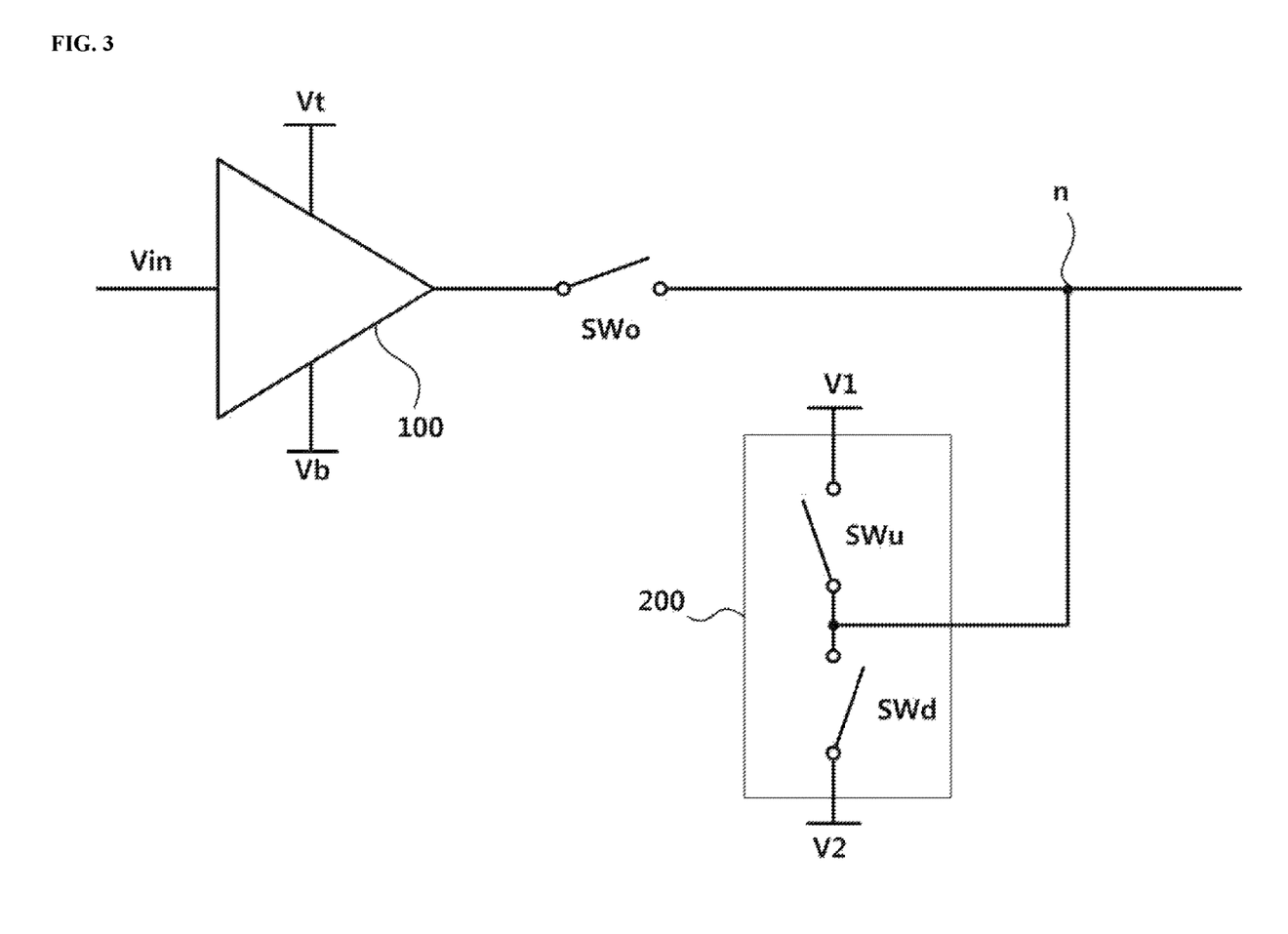
FIG. 3 is a diagram schematically showing a source driver according to the present embodiment.

FIG. 3 is a diagram schematically showing a source driver according to the present embodiment. Referring to FIG. 3, the source driver 10 according to the present embodiment includes an amplifier 100 which provides a grayscale signal, a second driving switch SWo which provides the output of the amplifier 100 to an output node n or blocks the output, and a first driving unit 200 which first drives the output node n at an intended voltage. In an exemplary embodiment, the first driving unit 200 includes a pull-up switch SWu which pulls up the output node n to a first voltage V1 and a pull-down switch SWd which pulls down the output node n to a second voltage V2.

One end of the pull-up switch SWu is connected to the first voltage V1 and the other end is electrically connected to the output node n. One end of the pull-down switch SWd is connected to the second voltage V2 and the other end is electrically connected to the output node n. Therefore, the output node n is pulled up to the first voltage V1 when the pull-up switch SWu is closed, and is pulled down to the second voltage V2 when the pull-down switch SWd is closed.

In an exemplary embodiment, when a voltage Vin of a grayscale signal provided as an input to the amplifier 100 has a value between a maximum $Vin_{max}$ and a minimum $Vin_{min}$, a top voltage Vt, which is a supply voltage of the amplifier 100 is greater than the maximum $Vin_{max}$ of the grayscale voltage, and a bottom voltage Vb is less than the minimum $Vin_{min}$ of the grayscale voltage.

Voltage of the first voltage V1 provided to the first driving unit 200 can be greater than the maximum of the grayscale voltage $Vin_{max}$ and can be greater than the voltage of the top voltage Vt which is provided to the amplifier 100. And, voltage of the second voltage V2 provided to the first driving unit 200 can be less than the minimum of the grayscale voltage $Vin_{min}$ and can be less than the voltage of the bottom voltage Vb which is provided to the amplifier 100.

The pull-up switch SWu, the pull-down switch SWd, and the second driving switch SWo may be implemented as semiconductor switches, such as a field effect transistor (FET) switch, a bipolar junction transistor (BJT) switch, and so on.

The pull-up switch SWu, the pull-down switch SWd, and the second driving switch SWo are controlled by a controller (not shown). In an exemplary embodiment, the controller is disposed in the source driver and generates a signal for controlling the switches. In another exemplary embodiment, the controller is disposed in the timing controller (see FIG. 1) and provides a control signal to the source driver.

Figure 4A:
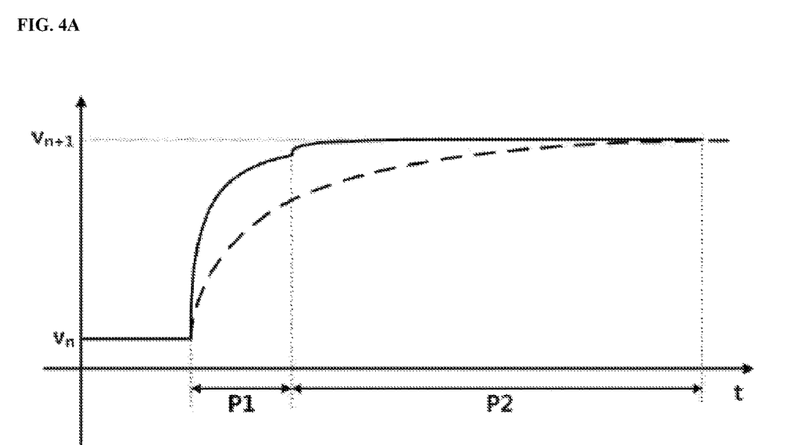
FIGS. 4(A) and 4(B) are graphs schematically showing changes in an output node voltage.

The operation of the source driver according to the present embodiment will be described below with reference to FIGS. 3 and 4. It is assumed that the source driver drives any one pixel at a voltage $v_n$ and a voltage for driving a pixel which is connected to the same source line as the pixel and will be driven next is $v_{n+1}$. Referring to FIG. 4(A), in a first driving phase P1, when the voltage $v_{n+1}$ of a grayscale signal to be provided by the source driver 10 is greater than the voltage $v_n$ provided to the output node n, the controller controls the second driving switch SWo to be turned off and the pull-up switch SWu to be turned on. The output node n is first driven by the first driving unit 200 at the first voltage V1.

When the output node n is driven by the first driving unit 200, a current greater than in a case of driving the output node n using an amplifier with a limited slew rate is provided. Therefore, a voltage (a solid line) of the output node n corresponding to a case in which the first driving unit 200 drives the output node n changes more rapidly than a voltage (a broken line) corresponding to a case in which the amplifier 100 drives the output node n.

In a second driving phase P2, the controller controls both the pull-up switch SWu and the pull-down switch SWd to be turned off and controls the second driving switch SWo to be turned on, so that the amplifier 100 drives the output node n. The amplifier 100 provides a voltage dependent on an intended grayscale signal to a pixel by driving the output node n to a voltage of the intended grayscale signal.

Figure 4B:
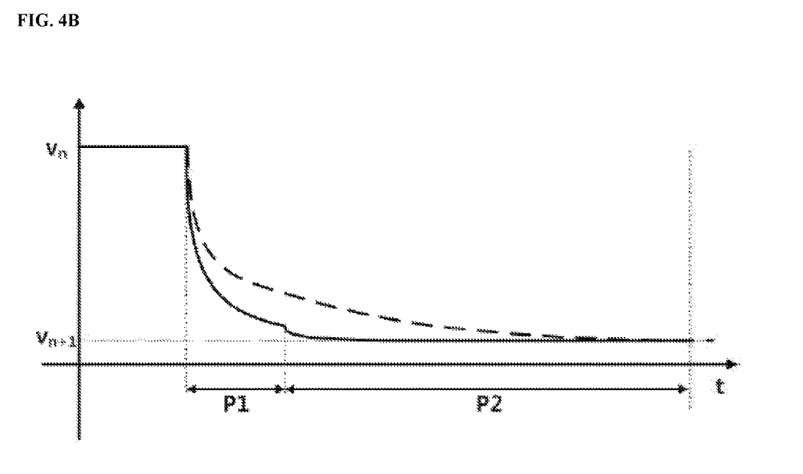

FIG. 4(B) is a graph showing a schematic voltage form at the output node n when the voltage $v_{n+1}$ of a grayscale signal to be provided by the source driver is less than the voltage $v_n$ provided to the output node n. In the first driving phase P1, when the voltage $v_{n+1}$ of a grayscale signal to be provided by the source driver is less than the voltage $v_n$ provided to the output node n, the controller controls the second driving switch SWo to be turned off and controls the pull-down switch SWd to be turned on.

When a power supply which provides the second voltage V2 drives the output node n, a current greater than in a case in which the amplifier 100 with a limited slew rate drives the output node n is provided to a load. Therefore, the voltage of the output node n falls more rapidly than a voltage (a broken line) of a case in which the amplifier 100 drives the output node n.

In the second driving phase P2, the controller controls the pull-down switch SWd to be turned off and controls the second driving switch SWo to be turned on. In the second driving phase P2, the amplifier 100 provides an intended grayscale signal $v_{n+1}$ to a pixel by driving the output node n.

In an exemplary embodiment, an electrical distance between a source driver and a pixel may vary according to a position of the pixel in the display panel, and a resistance and a capacitance at the source driver increase with an increase in the electrical distance between the source driver and the pixel. When a time period of the first driving phase P1 is determined irrespective of an electrical distance between a source driver and a pixel, although the output node n has not been sufficiently driven, a pixel having a long electrical distance from the source driver may be switched to the second driving phase P2. Therefore, with an increase in an electrical distance between a source driver and a pixel, the controller lengthens the time period of the first driving phase P1 so that the output node n is charged to a sufficient voltage.

Even when there is a large difference between the voltage $v_n$ provided to the output node n and the voltage $v_{n+1}$ to be provided next, the controller may lengthen the time period of the first driving phase P1 so that the output node n may be charged to a sufficient voltage. On the other hand, when there is a small difference between the voltage $v_n$ provided to the output node n and the voltage $v_{n+1}$ to be provided next, the controller may shorten the time period of the first driving phase P1. When the output node n is driven by an amplifier with a limited slew rate, a rise time in which a voltage rises and a fall time are limited by the slew rate of the amplifier. To reduce a time required for the output node n to reach an intended voltage, it is necessary to increase a bias current of the amplifier 100. However, when the bias current of the amplifier 100 increases, bias currents of all channels increase, and power consumption increases.

According to the present embodiment, it is possible to reduce a limitation caused by a slew rate, and the output node n may be driven at high speed. Further, since it is unnecessary to increase a bias current of the buffer for high speed operation, statically consumed power may be reduced.

According to an exemplary embodiment exemplified in FIG. 4(A), in the first driving phase P1, a voltage at which the first driving unit 200 drives the output node n does not exceed a voltage of a grayscale signal. However, this is just an exemplary embodiment. In the first driving phase P1, the first driving unit 200 may drive the output node n at a voltage exceeding the grayscale voltage, and in the second driving phase P2, the voltage of the output node n may be reduced and settled to the voltage of the grayscale signal when the amplifier 100 drives the output node n at the voltage of the grayscale signal.

Likewise, according to an exemplary embodiment shown in FIG. 4(B), in the first driving phase P1, a voltage at which the first driving unit 200 drives the output node n is not reduced to less than a voltage of a grayscale signal. However, this is just an exemplary embodiment. In the first driving phase P1, the voltage of the output node n may be less than the grayscale voltage, and in the second driving phase P2, the voltage of the output node n may increase and settled to the grayscale voltage when the amplifier 100 drives the output node n.

Figure 5:
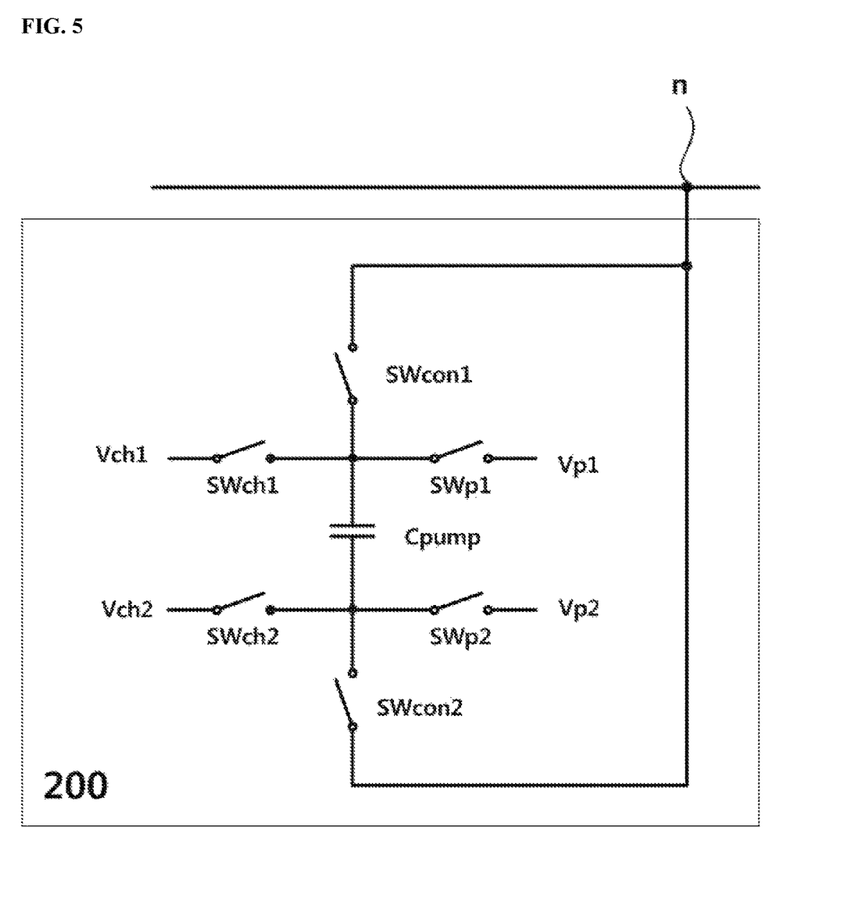
FIG. 5 is a diagram schematically showing another example of a first driving unit according to the present embodiment.

FIG. 5 is a diagram schematically showing another example of the first driving unit 200 according to the present embodiment. Referring to FIG. 5, the first driving unit 200 includes a first charging switch SWch1 which provides or blocks a first charging voltage Vch1, a second charging switch SWch2 which provides or blocks a second charging voltage Vch2, a pumping capacitor Cpump which has one end provided with the first charging voltage Vch1 and the other end provided with the second charging voltage Vch2 and is charged to a voltage corresponding to a potential difference between the first charging voltage Vch1 and the second charging voltage Vch2, a first pumping switch SWp1 which provides or blocks a first pumping voltage Vp1, a second pumping switch SWp2 which provides or blocks a second pumping voltage Vp2, a first connection switch SWcon1 which connects the end of the pumping capacitor Cpump to the output node n, and a second connection switch SWcon2 which connects the other end of the pumping capacitor Cpump to the output node n.

Assuming that the first charging voltage Vch1 is greater than the second charging voltage Vch2 (Vch1>Vch2), the operation of the first driving unit 200 according to the present embodiment will be described. However, this case is intended to facilitate description and understanding, and the scope of the present invention is not limited thereto.

Figure 6A:
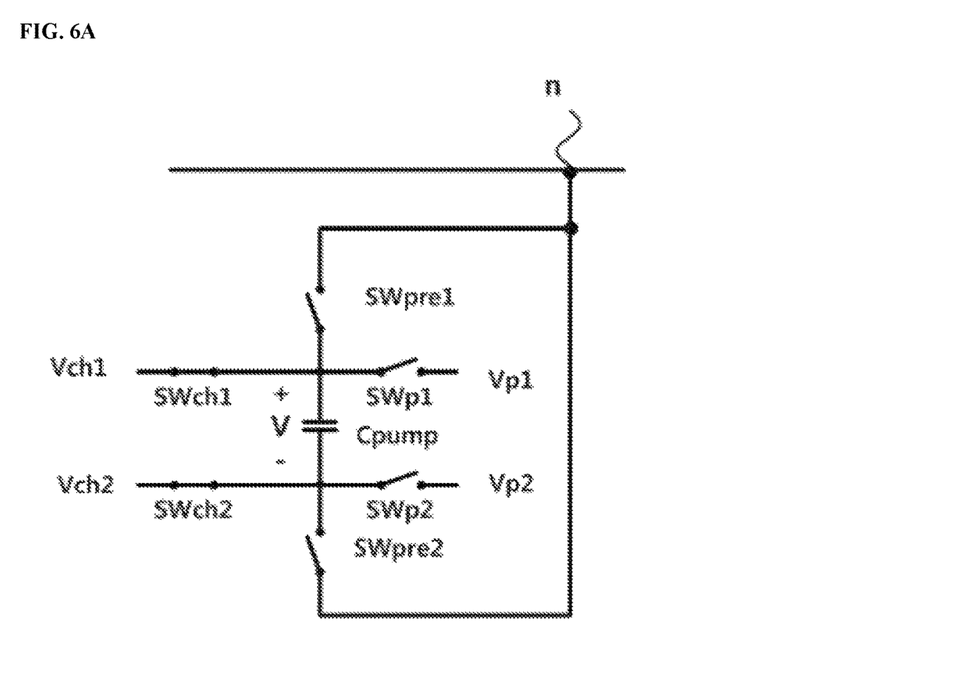
FIGS. 6(A), 6(B), 7(A), and 7(B) are diagrams illustrating the operation of the first driving unit according to the present embodiment.

A case of driving the output node n at the voltage $v_{n+1}$ (see FIG. 4(A)) of a grayscale signal higher than the voltage $v_n$ (see FIG. 4(A)) provided to the output node n will be described below with reference to FIGS. 6(A) and 6(B). Referring to FIG. 6(A), the controller controls the first charging switch SWch1 and the second charging switch SWch2 to be closed so that the pumping capacitor Cpump is charged to a voltage V corresponding to a difference between the first pumping voltage Vp1 and the second pumping voltage Vp2. In an exemplary embodiment, a process of charging the pumping capacitor Cpump is performed in the second driving phase P2 in which the source driver drives a pixel and provides a grayscale signal to the pixel.

Figure 6B:
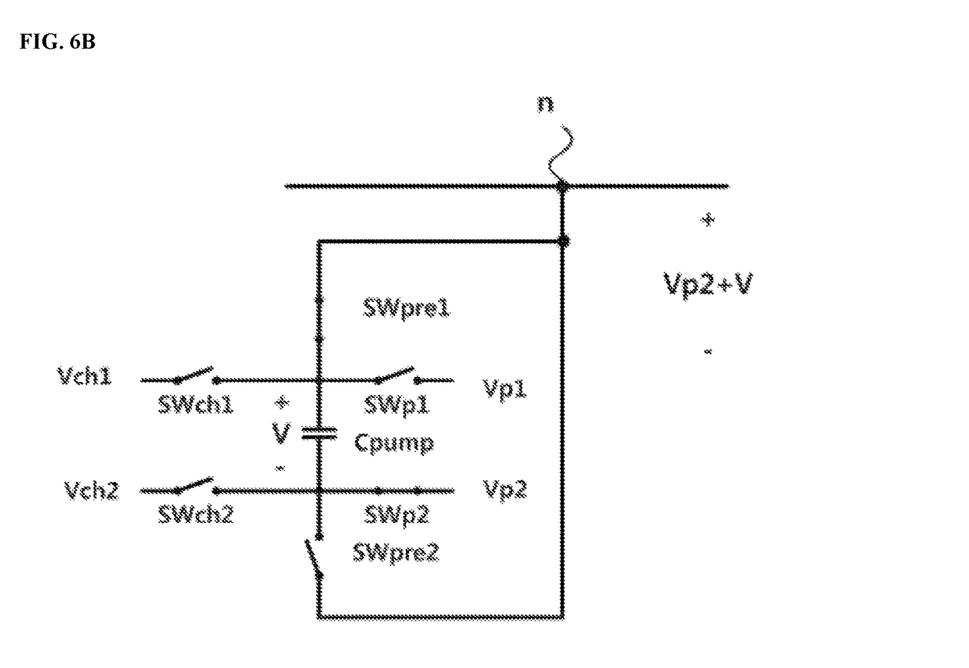

Referring to FIG. 6(B), during the first driving phase P1, the controller controls the first charging switch SWch1 and the second charging switch SWch2 to be opened and controls the first connection switch SWcon1 and the second pumping switch SWp2 to be closed. With the closing of the first connection switch SWcon1 and the second pumping switch SWp2, the output node n is driven at a voltage V+Vp2 obtained by adding the voltage charged in the pumping capacitor Cpump and the second pumping voltage Vp2. Since charge stored in the pumping capacitor Cpump drives the output node n, it is possible to raise the voltage of the output node n more rapidly than in a case of driving the output node n with only the amplifier 100 (see FIG. 3) with a limited slew rate.

During the second driving phase P2 after the first driving phase P1 ends, the output node n is driven by the amplifier 100 at the voltage $v_{n+1}$ of the grayscale signal, and the controller charges the pumping capacitor Cpump by controlling the first charging switch SWch1 and the second charging switch SWch2 to be closed as shown in FIG. 6(A).

Figure 7A:
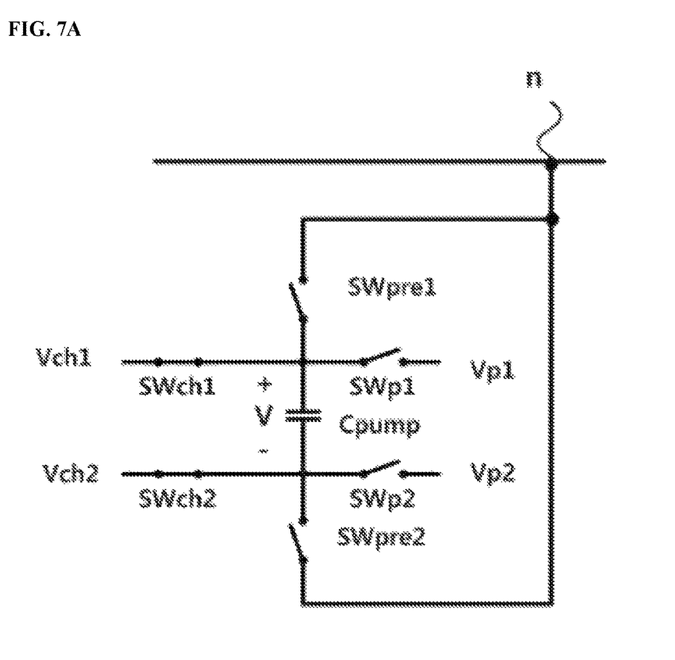
Figure 7B:
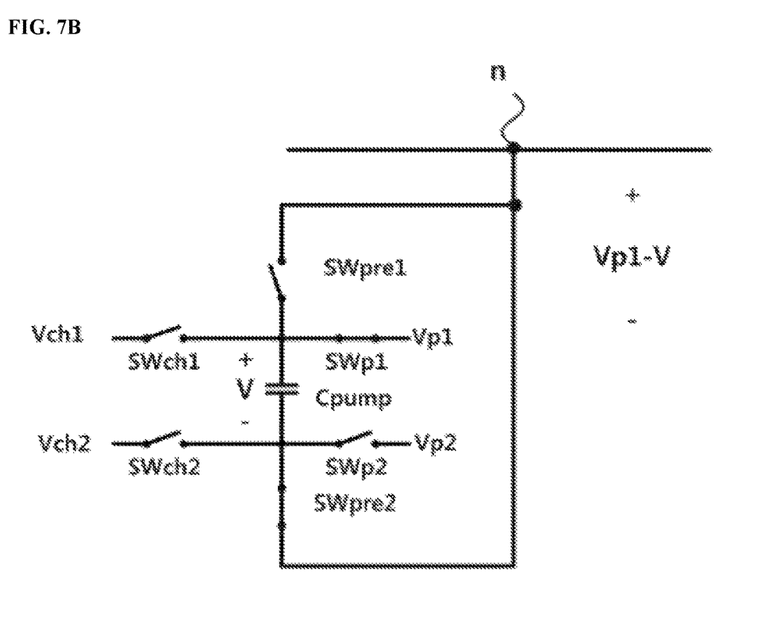

A case of driving the output node n at the voltage $v_{n+1}$ (see FIG. 4(B)) of a grayscale signal lower than the voltage $v_n$ (see FIG. 4(B)) provided to the output node n will be described below with reference to FIGS. 7(A) and 7(B). Referring to FIG. 7(A), the controller controls the first charging switch SWch1 and the second charging switch SWch2 to be closed so that the pumping capacitor Cpump is charged to the voltage V corresponding to a difference between the first charging voltage Vch1 and the second charging voltage Vch2.

Subsequently, the controller controls the first pumping switch SWp1 and the second connection switch SWcon2 to be closed. Therefore, the output node n is first driven at a voltage Vp1-V obtained by adding the voltage charged in the pumping capacitor Cpump and the first pumping voltage Vp1.

During the second driving phase P2 after the first driving phase P1 ends, the controller controls the second connection switch SWcon2 to be opened, causes the amplifier 100 (see FIG. 3) to drive the output node n to a voltage of a grayscale signal, and controls the first charging switch SWch1 and the second charging switch SWch2 to be closed, thereby charging the pumping capacitor Cpump. The controller controls the second driving switch SWo to be closed so that the amplifier 100 drives the output node n at the voltage dependent on the grayscale signal.

According to the present embodiment, during the first driving phase P1, charge stored in the pumping capacitor Cpump drives the output node n, and thus an intended voltage may be obtained more rapidly than in a case of driving the output node n with only the amplifier 100 (see FIG. 3).

According to the present embodiment, since the output node n is driven at a voltage charged in the pumping capacitor Cpump during the precharge phase P1, the output node n may be driven with a current greater than in a case in which the amplifier 100 with a limited slew rate drives the output node n. Therefore, conductive lines and pixels which are capacitive loads are charged more rapidly, and high speed operation is possible.

According to the present embodiment, since the output node n is driven by the pumping capacitor, it is possible to increase a current for driving a source line sl during the first driving phase P1. Further, since the output node n is driven by applying a pumping voltage to the pumping capacitor Cpump after the pumping capacitor Cpump is charged with charging voltages, the output node n may be driven with a high voltage. Therefore, according to the present embodiment, it is possible to drive the output node n with a high voltage and a high current.

According to the present embodiment, an output node may be driven at higher speed than in a case of driving the output node using an amplifier with a limited slew rate, and thus it is possible to drive a display panel at high speed.

Although the present invention has been described with reference to the exemplary embodiments depicted in the drawings, they are just examples, and it will be apparent to those of ordinary skill in the art that various modifications and equivalents can be made from the exemplary embodiments. Therefore, the true technical scope of the present invention should be defined by the appended claims.

What is claimed is:

1. A source driver for receiving a digital signal and providing a grayscale signal corresponding to the digital signal, the source driver comprising:
    an amplifier configured to provide the grayscale signal;
    a second driving switch configured to provide the grayscale signal provided by the amplifier to an output node or block the grayscale signal; and
    a first driving unit including a pumping capacitor and configured to first drive the output node at a voltage charged in the pumping capacitor,
    wherein the output node is first driven by the first driving unit and then second driven by the amplifier with the grayscale signal,
    wherein the first driving unit comprises:
        a pumping voltage source configured to provide a pumping voltage; and
        the pumping capacitor configured to be charged with the pumping voltage,
    wherein the pumping voltage provided by the pumping voltage source and the pumping voltage charged in the pumping capacitor are added and drive the output node,
    wherein a time in which the first driving unit first drives the output node corresponds to an electrical distance between the source driver and a pixel connected to the output node, and
    wherein the electrical distance includes a length of a source line which connects the source driver and the pixel.

2. The source driver of claim 1, wherein the second driving switch is turned off while the output node is first driven by the first driving unit and turned on after the first driving.

3. The source driver of claim 1, wherein a time in which the first driving unit first drives the output node corresponds to an electrical distance between the source driver and a pixel connected to the output node.

4. The source driver of claim 1, wherein the amplifier is a unity gain buffer amplifier.

5. The source driver of claim 1 wherein a time in which the first driving unit first drives the output node corresponds to a difference between a voltage provided to the output node and a voltage of the grayscale signal to be provided to the output node.

6. A display device for displaying content, the display device comprising:
    a timing controller;
    a gate driver;
    a display panel; and
    a source driver configured to receive a digital signal and output a grayscale signal corresponding to the digital signal,
    wherein the source driver comprises:
        an amplifier configured to provide the grayscale signal;
        a second driving switch configured to provide the grayscale signal provided by the amplifier to an output node or block the grayscale signal; and
        a first driving unit configured to first drive the output node at an intended voltage,
    wherein the output node is first driven by the first driving unit and then second driven by the amplifier at a grayscale voltage,
    wherein the first driving unit comprises:
        a pumping voltage source configured to provide a pumping voltage; and
        a pumping capacitor configured to be charged with the pumping voltage,
    wherein the pumping voltage provided by the pumping voltage source and the pumping voltage charged in the pumping capacitor are added and drive the output node,
    wherein a time in which the first driving unit first drives the output node corresponds to an electrical distance between the source driver and a pixel connected to the output node, and
    wherein the electrical distance includes a length of a source line which connects the source driver and the pixel.

* * * * *